United States Patent
Ryu et al.

(10) Patent No.: US 10,138,796 B2
(45) Date of Patent: Nov. 27, 2018

(54) FERRITIC STAINLESS STEEL FOR AUTOMOTIVE EXHAUST SYSTEM, WHICH HAVE EXCELLENT CORROSION RESISTANCE AGAINST CONDENSATE, MOLDABILITY, AND HIGH-TEMPERATURE OXIDATION RESISTANCE, AND METHOD FOR MANUFACTURING SAME

(71) Applicant: POSCO, Pohang-si (KR)

(72) Inventors: Han Jin Ryu, Pohang-si (KR); Gi Sun Tae, Pohang-si (KR); Hyung Gu Kang, Pohang-si (KR); Hun Jae Ha, Pohang-si (KR)

(73) Assignee: POSCO, Pohang-si (KR)

( * ) Notice: Subject to any disclaimer, the term of this patent is extended or adjusted under 35 U.S.C. 154(b) by 278 days.

(21) Appl. No.: 14/654,949

(22) PCT Filed: Dec. 27, 2012

(86) PCT No.: PCT/KR2012/011626
§ 371 (c)(1),
(2) Date: Jun. 23, 2015

(87) PCT Pub. No.: WO2014/104424
PCT Pub. Date: Jul. 3, 2014

(65) Prior Publication Data
US 2015/0345361 A1 Dec. 3, 2015

(30) Foreign Application Priority Data

Dec. 24, 2012 (KR) .................. 10-2012-0152206
Dec. 26, 2012 (KR) .................. 10-2012-0153792

(51) Int. Cl.
*F01N 13/16* (2010.01)
*C21D 6/00* (2006.01)
(Continued)

(52) U.S. Cl.
CPC ............ *F01N 13/16* (2013.01); *B32B 15/012* (2013.01); *C21D 6/002* (2013.01); *C21D 6/005* (2013.01);
(Continued)

(58) Field of Classification Search
CPC ............ F01N 13/16; C25F 1/06; C21D 6/008; C21D 6/005; C21D 8/005; C21D 6/002;
(Continued)

(56) References Cited

U.S. PATENT DOCUMENTS

| | | | | |
|---|---|---|---|---|
| 3,026,606 A | * | 3/1962 | Nickola | C23C 2/12 420/546 |
| 2011/0265920 A1 | * | 11/2011 | Hatano | C21D 1/76 148/606 |
| 2013/0011294 A1 | | 1/2013 | Matsuhashi et al. | |

FOREIGN PATENT DOCUMENTS

| CN | 101395293 A | 3/2009 |
|---|---|---|
| CN | 101903553 A | 12/2010 |

(Continued)

OTHER PUBLICATIONS

Li Zhou et al., "Steel Pickling Technology", Chemical Industry Press, 2007, p. 196, partial translation.
(Continued)

*Primary Examiner* — Peter F Godenschwager
*Assistant Examiner* — Andrew J. Oyer
(74) *Attorney, Agent, or Firm* — The Webb Law Firm (57) ABSTRACT

Provided is a ferritic stainless steel having excellent corrosion resistance against condensate, moldability, and high-temperature oxidation resistance, wherein the ferritic stainless steel is capable of being manufactured in an economically advantageous manner without adding expensive alloying elements. The ferritic stainless steel includes, by weight %, C: greater than 0 and 0.01% or less, Cr: 9 to
(Continued)

13%, Si: 0.5 to 1.0%, Mn: greater than 0 and 0.5% or less, P: greater than 0 and 0.035% or less, S: greater than 0 and 0.01% or less, Ti: 0.15 to 0.5%, N: greater than 0 and 0.01% or less, Sn: 0.05 to 0.5%, and the remainder is Fe and inevitable impurities, wherein Sn concentrated at the surface part of the stainless steel is 10 times or more than Sn concentrated at the base part.

8 Claims, 8 Drawing Sheets

(51) Int. Cl.

| | | |
|---|---|---|
| *C21D 8/00* | (2006.01) | |
| *C25F 1/06* | (2006.01) | |
| *B32B 15/01* | (2006.01) | |
| *C23C 2/12* | (2006.01) | |
| *C23C 2/02* | (2006.01) | |
| *C22C 38/02* | (2006.01) | |
| *C22C 38/00* | (2006.01) | |
| *C21D 9/46* | (2006.01) | |
| *C22C 38/04* | (2006.01) | |
| *C22C 38/20* | (2006.01) | |
| *C22C 38/18* | (2006.01) | |
| *C22C 38/28* | (2006.01) | |

(52) U.S. Cl.
CPC ............... *C21D 6/008* (2013.01); *C21D 8/00* (2013.01); *C21D 8/005* (2013.01); *C21D 9/46* (2013.01); *C22C 38/00* (2013.01); *C22C 38/001* (2013.01); *C22C 38/004* (2013.01); *C22C 38/008* (2013.01); *C22C 38/02* (2013.01); *C22C 38/04* (2013.01); *C22C 38/18* (2013.01); *C22C 38/20* (2013.01); *C22C 38/28* (2013.01); *C23C 2/02* (2013.01); *C23C 2/12* (2013.01); *C25F 1/06* (2013.01); *C21D 2211/005* (2013.01); *Y10T 428/12757* (2015.01)

(58) Field of Classification Search
CPC ...... C21D 8/00; C21D 9/46; C21D 2211/005; C23C 2/12; C23C 2/02; B32B 15/012; C22C 38/28; C22C 38/004; C22C 38/04; C22C 38/02; C22C 38/008; C22C 38/001; C22C 38/20; C22C 38/00; C22C 38/18; Y10T 428/12757
See application file for complete search history.

(56) References Cited

FOREIGN PATENT DOCUMENTS

| | | |
|---|---|---|
| CN | 102245789 A | 11/2011 |
| CN | 102639737 A | 8/2012 |
| JP | 05-295513 | 11/1993 |
| JP | 06-145906 | 5/1994 |
| JP | 11-092872 | 4/1999 |
| JP | 2001288544 A | 10/2001 |
| JP | 2002-012954 | 1/2002 |
| JP | 2008-190003 | 8/2008 |
| JP | 2009-174036 | 8/2009 |
| JP | 2010-031315 | 2/2010 |
| KR | 1020100001180 A | 1/2010 |
| KR | 1020100033207 A | 3/2010 |
| KR | 1020100087225 B1 | 8/2010 |
| KR | 1020120049410 B1 | 5/2012 |
| KR | 1020120063793 A | 6/2012 |
| KR | 10-2012-0112851 A | 10/2012 |

OTHER PUBLICATIONS

Dongli Fan et al., "Hot Treatment Technical Manuals", Chemical Industry Press, 2009, p. 372, vol. 3, partial translation.

* cited by examiner

| | 17Cr-1Mo | 11Cr | 11Cr-0.1Sn | AL PLATED 11Cr-0.1Sn |
|---|---|---|---|---|
| (a) NOT HEAT TREATED 5% NaCl | | | | |
| (b) NOT HEAT TREATED -(5% NaCl + 5% CaCl2) | | | | |
| (c) 400-24hrs HEAT TREATED -(5% NaCl + 5% CaCl2) | | | | |

FIG. 9

FERRITIC STAINLESS STEEL FOR AUTOMOTIVE EXHAUST SYSTEM, WHICH HAVE EXCELLENT CORROSION RESISTANCE AGAINST CONDENSATE, MOLDABILITY, AND HIGH-TEMPERATURE OXIDATION RESISTANCE, AND METHOD FOR MANUFACTURING SAME

CROSS-REFERENCE TO RELATED APPLICATIONS

This application is the United States national phase of International Application No. PCT/KR2012/011626 filed Dec. 27, 2012, and claims priority to Korean Patent Application Nos. 10-2012-0152206 and 10-2012-0153792, filed Dec. 24, 2012 and Dec. 26, 2012, respectively, the disclosures of which are hereby incorporated in their entirety by reference.

TECHNICAL FIELD

The present invention relates to a ferritic stainless steel for an automotive exhaust system, and a method of manufacturing the same, and more particularly, to a ferritic stainless steel which is used in parts of the automotive exhaust system to improve condensate corrosion resistance, and has excellent formability and high temperature oxidation resistance, and a method of manufacturing the same.

BACKGROUND ART

In general, parts of an automotive exhaust system are classified into a hot part and a cold part according to a temperature of an exhaust gas. The automotive components of the hot parts include an exhaust manifold, a converter, a bellows, etc. These are primarily used at a temperature of 600° C. or more, and thus are required to have excellent high temperature strength, thermal fatigue, high temperature salt corrosion properties, etc. On the other hand, the cold parts are used at a temperature of 400° C. or less, such as a muffler for decreasing the noise of an automotive exhaust gas. Due to condensate corrosion properties resulting from a sulfur (S) component in an automotive fuel, exterior rust/corrosion properties according to the use of a snow removal salt in winter, and the like, materials such as stainless (or STS) 409, 409L, 439, 436L and the like are used for the cold parts of the automotive exhaust system.

Particularly, a material of stainless 409 or 409L is a steel grade which includes Cr at 11%, has C and N stabilized by Ti, prevents sensitization of the weld and has excellent formability. The above-described steel grade is primarily used at a temperature of 700° C. or less, has a certain degree of corrosion resistance with respect to components of condensed water generated in the automotive exhaust system, and thus is a steel grade which is most frequently used.

Meanwhile, stainless 439 has C and N stabilized by Ti, and has about 17% Cr. Further, stainless 436L is steel which is obtained by adding about 1% Mo to stainless 439, and has excellent condensate corrosion properties and corrosion resistance properties.

Meanwhile, the S component in automobile fuel components is concentrated in $SO_4^{2-}$, and thus is changed to a highly corrosive sulfuric ($H_2SO_4$) atmosphere having a pH of 2 or less. When a stainless 409L material, which is most frequently used, is used for an automotive muffler material used in an area where a large amount of the S components are contained in gasoline components as described above, corrosion caused by condensed water or the like occurs. In this case, there is a problem in that it is difficult for the automotive to meet the warranty of a car manufacturer. Accordingly, the use of a high Cr-based stainless material such as stainless 439, 436L or the like including a Cr component at 17% or more is gradually increasing, currently. However, a resource price of this material is gradually increasing, and thus there is a need for the development of a stainless material which is manufactured by adding other elements instead of adding expensive elements such as Mo or the like to have condensate corrosion properties which are at least equal to a material of stainless 439 or 436L.

Meanwhile, an aluminum-plated stainless steel plate which is manufactured by hot-dip coating a stainless 409L material with aluminum has been developed and used in order to improve exterior rust/corrosion properties attributable to the occurrence of surface oxidation or surface discoloration. However, in general, a passivation film is present on a surface of a stainless steel plate, and the passivation film degrades the wetting properties of hot dipping. Accordingly, there is a problem in that aluminum plating is difficult to be performed without a separate treatment process such as atmosphere control.

The present invention relates to a ferritic stainless steel for automotive exhaust system having excellent corrosion resistance, particularly condensate corrosion resistance and formability, and a method of manufacturing the same. The objective of the present invention is directed to providing the ferritic stainless steel having improved condensate corrosion resistance under the environment of the use of a high sulfur fuel and excellent formability, by adding a small amount of an alloying element of Sn, or Sn and Cu to the ferritic stainless steel, and the method of manufacturing the same.

Further, the objective of the present invention is directed to providing the ferritic stainless steel, which has condensate corrosion resistance at least equal to that of a stainless 439 or 436L material of which corrosion resistance is improved by adding an element such as Mo or the like to an existing 17Cr alloy base, and which may also be manufactured without adding an expensive element such as Mo or the like thereto, and the method of manufacturing the same.

Further, the objective of the present invention is directed to providing the ferritic stainless steel, which is plated with aluminum in order to improve condensate corrosion resistance, formability, and high temperature oxidation resistance properties, and the method of manufacturing the same.

SUMMARY OF THE INVENTION

According to an aspect of the present invention, there is provided a ferritic stainless steel having excellent condensate corrosion resistance, formability and high temperature oxidation resistance, which includes, by wt %, C: more than 0 and 0.01% or less, Cr: 9 to 13%, Si: 0.5 to 1.0%, Mn: more than 0 and 0.5% or less, P: more than 0 and 0.035% or less, S: more than 0 and 0.01% or less, Ti: 0.15 to 0.5%, N: more than 0 and 0.01% or less, Sn: 0.05 to 0.5%, and Fe and unavoidable impurities as a remainder, wherein Sn concentrated at a surface part of a stainless steel is 10 times or more than Sn concentrated at a base part.

According to an embodiment of the present invention, 0.05 to 0.15% Sn may be included at the base part of the stainless steel, and 0.5 to 1.5% Sn may be included in a part extending from the surface of the stainless steel to a depth of 0 to 1 μm in a depth direction.

According to the embodiment of the present invention, when 0.1% Sn is included at the base part of the stainless steel, at least 1% Sn may be included in a part extending from the surface of the stainless steel to a depth of 0.1 µm in a depth direction.

According to the embodiment of the present invention, the stainless steel may further include 0.5 to 1.0% Cu. Here, it is preferable that (5Sn+Cu) is in the range of 0.5 to 2.0.

According to the embodiment of the present invention, the stainless steel preferably has (Si+Ti)/(C+N) in the range of 50 to 90.

According to the embodiment of the present invention, a surface of the stainless steel may be hot-dip coated with aluminum at a thickness of 200 µm or less.

According to the embodiment of the present invention, the stainless steel may have a maximum corrosion depth of 0.25 mm or less measured using a JASO M609-91 method which is a method for measuring corrosion resistance under the environment of condensed water.

According to the embodiment of the present invention, the stainless steel may have a corrosion area ratio of 5% or less, which is measured after 3 cycles were repeated according to a JASO M611-92 method, and a maximum corrosion depth of 0.25 mm or less, which is measured after 100 cycles were repeated, the JASO M611-92 method is a method for measuring exterior rust of automotive exhaust system.

According to another aspect of the present invention, there is provided a method of manufacturing a ferritic stainless steel having excellent condensate corrosion resistance, formability and high temperature oxidation resistance, including cold rolling and annealing a ferritic stainless steel plate which includes, by wt %, C: more than 0 and 0.01% or less, Cr: 9 to 13%, Si: 0.5 to 1.0%, Mn: more than 0 and 0.5% or less, P: more than 0 and 0.035% or less, S: more than 0 and 0.01% or less, Ti: 0.15 to 0.5%, N: more than 0 and 0.01% or less, Sn: 0.05 to 0.5%, and Fe and unavoidable impurities as a remainder; and removing Si oxide included in an annealing scale through primary neutral salt electrolytic pickling and secondary sulfuric acid electrolytic pickling. According to the embodiment of the present invention, the cold rolling and annealing is performed in a temperature range of 980 to 1,020° C.

According to the embodiment of the present invention, it is preferable that conditions of the primary neutral salt electrolytic pickling include a temperature in the range of 70 to 90° C. and a neutral salt concentration in a range of 150 to 250 g/L, and conditions of the secondary sulfuric acid electrolytic pickling include a temperature in the range of 30 to 50° C. and a sulfuric acid concentration in a range of 65 to 85 g/L.

Further, according to the embodiment of the present invention, a surface of the stainless steel may be hot-dip coated with aluminum at a thickness of 200 µm or less.

According to still another aspect of the present invention, there is provided a method of manufacturing a ferritic stainless steel having excellent condensate corrosion resistance, formability and high temperature oxidation resistance, including heating a ferritic stainless steel slab, which includes, by wt %, C: more than 0 and 0.01% or less, Cr: 9 to 13%, Si: 0.5 to 1.0%, Mn: more than 0 and 0.5% or less, P: more than 0 and 0.035% or less, S: more than 0 and 0.01% or less, Ti: 0.15 to 0.5%, N: more than 0 and 0.01% or less, Sn: 0.05 to 0.5%, and Fe and unavoidable impurities as a remainder, in a temperature range of 1,100 to 1,240° C.; performing hot rolling and annealing in a temperature range of 1,030 to 1,070° C. after hot rolling the slab; performing cold rolling and cold annealing in a temperature range of 980 to 1,020° C.; preprocessing a base metal of a stainless steel after the cold rolling and annealing; preheating and heating; and hot-dip coating with aluminum.

According to the embodiment of the present invention, the preprocessing of the stainless steel may be performed using an electrolytic cleaning method, in which the stainless steel is bathed in a caustic soda solution having a concentration in a range of 2 to 5% in a temperature range of 60 to 80° C. in a high temperature bath tank to remove foreign substances such as oil or the like from a surface of the base metal of the stainless steel under conditions of an electrolytic process, and final cleaning is performed in a high temperature cleaning tank.

According to the embodiment of the present invention, in the preheating and heating of the stainless steel, the preheating may be performed under conditions of a preheating temperature of 530° C. or more and oxygen concentration of 20 ppm or more such that a composite oxide layer of activated Fe and Cr is formed on a preprocessed surface of the base metal, the stainless steel may be heated under conditions of a heating temperature in the range of 900 to 1,000° C., a hydrogen concentration of 30% or more, and a dew point temperature in the range of −30 to −45° C., and cooled to a temperature in the range of about 630 to 730° C. for annealing such that the composite oxide layer of activated Fe and Cr is reduced.

According to the embodiment of the present invention, in the hot dip coating the stainless steel with aluminum, an annealed base metal may be plated in a molten aluminum plating bath in a temperature range of 600 to 700° C., and a plated steel plate may be cooled at a cooling rate in a range of 20 to 40° C./sec to a temperature of 350° C. or less to manufacture a plated steel plate.

According to the embodiment of the present invention, composition of the molten aluminum plating bath may include Al at 88 to 92% and Si at 8 to 11%, and the stainless steel may be hot-dip coated with aluminum at a thickness of 200 µm or less.

Advantageous Effects

According to the embodiment of the present invention, the ferritic stainless steel having improved condensate corrosion properties and formability can be provided to parts of an automotive exhaust system.

Further, according to the embodiment of the present invention, a component of the automotive exhaust system having condensate corrosion properties at least equal to that of a stainless 439 or 436L steel in an area such as China or the like in which an existing high sulfur fuel is used can be manufactured without increasing a manufacturing cost.

Further, according to the embodiment of the present invention, the ferritic stainless steel for the automotive exhaust system having economic efficiency and excellent formability can be provided without adding expensive alloying elements thereto.

Further, according to the embodiment of the present invention, the ferritic stainless steel for the aluminum plated steel plate for the automotive exhaust system having improved condensate corrosion properties and high temperature oxidation resistance can be provided.

DETAILED DESCRIPTION AND BEST MODES OF THE INVENTION

Hereinafter, the present invention will be described in detail in conjunction with the drawings. Advantages and features of the present invention, and the method of achieving the same will be obvious with reference to embodiments along with the accompanying drawings which are described below. Alloy components of the ferritic stainless steel as described above and a method of manufacturing the stainless steel will be described below, and the improvement effect of condensate corrosion resistance and formability according to the embodiment of the present invention will be described in detail in conjunction with the drawings.

Conventionally, a variety of techniques for improving condensate corrosion resistance and formability of parts of an automotive exhaust system have been suggested. First, Japanese Laid-open Patent Publication No. 2009-174036 discloses a stainless steel material for improving the properties of the passivation film by adding, by weight % (wt %), 0.01 to 0.2% Si, 13 to 22% Cr, and 0.001 to 1% Sn thereto. However, in the case of the above-described laid-open patent, an annealing process at a temperature in the range of 200 to 700° C. for 1 minute or more is required to improve the properties of the passivation film, and thus oxidation occurs particularly at a heated portion such as the automotive exhaust system, resulting in a decrease in pitting/corrosion resistance and rust/corrosion resistance.

Moreover, Japanese Laid-open Patent Publication No. 1994-145906 discloses that corrosion resistance at least equal to that of a stainless steel having 17Cr may be ensured by adding 0.3 to 2.0% Cu and 0.06 to 0.5% P and without adding Mo to a stainless steel. However, Cu and P are solid solution strengthening elements, and when a large amount of these elements are added to a stainless steel, formability is degraded. Unless a material applied to components of the automotive exhaust system has sufficient formability in addition to corrosion resistance, the material may not be applied.

Furthermore, Japanese Laid-open Patent Publication No. 2008-190003 discloses a technique to improve crevice corrosion properties of a stainless steel by adding at least one type of 0.005 to 2% Sn and 0.005 to 1% Sb thereto. However, since the above-described report is determining rust/corrosion properties in a chlorine atmosphere with a neutral environment, the stainless steel of the above-described report may not exhibit sufficient corrosion resistance in an acidic atmosphere such as the condensed water environment in the automotive exhaust system, and corrosion occurs at a portion such as exhaust system due to the influence of oxidation.

The present invention intends to suggest a ferritic stainless steel for the exhaust system, which may exhibit corrosion properties close to that of an existing, relatively expensive steel grade of stainless steel 439, but which may also be manufactured at a low cost, by synthetically designing components such as Cr, Si, Sn, Cu, Ti, C, N, or the like to improve condensate corrosion resistance and formability, and the method of manufacturing the ferritic stainless steel. To this end, hereinafter, alloy composition according to the embodiment of the present invention will be described first.

First, the present invention provides a ferritic stainless steel including, by wt %, C: 0.01% or less, Cr: 9 to 13%, Si: 0.5 to 1.0%, Mn: 0.5% or less, P: 0.035% or less, S: 0.01% or less, Ti: 0.05 to 0.5%, Sn: 0.05 to 0.5%, and Fe and unavoidable impurities as a remainder.

Particularly, the stainless steel according to the embodiment of the present invention includes 0.05 to 0.5% Sn, and Sn concentrated at a surface part of a stainless steel is 10 times or more than Sn concentrated at a base part. The surface part of the stainless steel ranges from an outermost surface portion to a depth of 1 μm in a depth direction, and preferably, to a depth of 0.1 μm.

Further, according to the embodiment of the present invention, 0.05 to 0.15% Sn is included at the base part of the stainless steel, but is included at 0.5 to 1.5% in the surface part of the stainless steel. Accordingly, Sn concentrated at the surface part is 10 times or more than Sn concentrated at the base part. According to the embodiment of the present invention, preferably, when Sn is included at 0.1% at the base part of the stainless steel, at least 1% Sn is included at the surface part of the stainless steel.

Further, according to the embodiment of the present invention, 0.5 to 1% Cu may be further included, by wt %. Here, it is preferable that the stainless steel has (5Sn+Cu) in the range of 0.5 to 2.0.

Further, according to the embodiment of the present invention, it is intended to improve condensate corrosion properties and formability of the stainless steel by adjusting (Si+Ti)/(C+N) in the stainless steel to be in the range of 50 to 90.

Hereinafter, the reason for limiting the compositional range of the alloying elements will be described in detail.

First, according to the embodiment of the present invention, C and N are Ti(C, N) carbonitride forming elements, and are present as interstitial alloying elements. When the contents of C and N as described above are increased, C and N solid solutions which are not formed as Ti(C, N) carbonitride lead to the degradation of an elongation rate and low temperature impact properties of a material, and when used at 600° C. or less for an extended period of time after welding, a $Cr_{23}C_6$ carbide is generated, and thereby intergranular corrosion may occur.

Accordingly, it is preferable to adjust the content range of each C and N to 0.01% or less. Meanwhile, when the contents of C and N are increased and a large amount of Ti is added, rigid inclusion increases, and thus many surface defects such as a scab are generated, nozzle clogging occurs during continuous casting, and an elongation rate and impact properties decrease due to the increase of a C and N solid solution, and thus the contents of C and N are limited to 0.02% or less.

Although Si is conventionally added to improve weld zone corrosion resistance, a pitting potential, and oxidation resistance, according to the embodiment of the present invention, a Si component suppresses diffusion and segregation of Cr at a temperature in the range of 400 to 700° C., preventing intergranular corrosion. According to the embodiment of the present invention, at least 0.5% or more of Si is added so as to improve a pitting potential, and oxidation resistance, and intergranular corrosion resistance properties. When 1.0% or more of Si is included, a problem such as an increase in rigid Si inclusions, surface defects, or the like is caused, and thus the content of Si is limited not to be greater than a maximum of 1.0%.

When the content of Mn increases, precipitates such as MnS or the like are formed, decreasing pitting corrosion resistance. However, an excessive decrease in Mn causes an increase in refining costs or the like, and thus the content of Mn is limited to 0.5% or less.

P and S form intergranular segregation and MnS precipitates to decrease hot workability, and thus the contents of P and S are preferably as small as possible. However, an excessive decrease in P and S causes an increase in refining costs or the like, and thus the content of P is limited to 0.035% or less, and the content of S is limited to 0.01% or less.

Cr is an essential element for securing corrosion resistance. When the content of Cr is low, condensate corrosion resistance decreases, and when the content of Cr is excessively high, corrosion resistance or the like is improved, and strength increases, but an elongation rate and impact properties decrease, and thus the content of Cr is limited to the range of 9 to 13%.

Ti is an effective element which prevents the occurrence of intergranular corrosion by fixing C and N. However, when the ratio of (Si+Ti)/(C+N) is low, intergranular corrosion occurs in weld zone or the like, decreasing corrosion resistance. Accordingly, the content of Ti is limited to at least 0.15%. However, an excessive addition of Ti leads to an increase in rigid inclusions, and thus many surface defects such as a scab are formed, and nozzle clogging occurs during continuous casting. Therefore, the content of Ti is limited to 0.5% or less.

Figure 4:
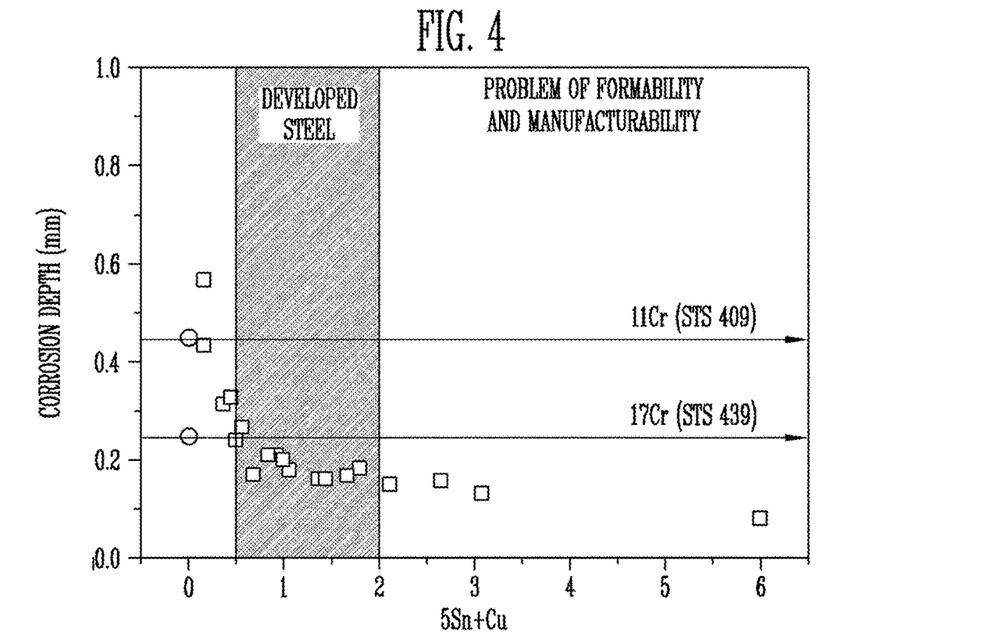
FIG. 4 shows a graph illustrating a result of a simulated corrosion test of an condensed water environment of the automotive exhaust system according to the addition ratio of 5Sn+Cu, in which Sn and Cu both are added to steel having 11%-Cr.

Particularly, when (Si+Ti)/(C+N) is controlled to the range of 50 to 90, intergranular corrosion may be prevented, and corrosion resistance may be improved. Referring to FIG. 4, the critical range of intergranular corrosion occurrence is shown. It will be described in detail below.

Sn is an essential element for securing target corrosion resistance of the present invention. In order to secure target corrosion resistance of the present invention, an addition of at least 0.05% Sn or more is required.

However, an excessive addition of Sn causes a decrease in hot workability and manufacturability, and thus the upper limit of Sn is limited to 0.5%. According to the embodiment of the present invention, when about 0.1% Sn is added, Sn is added to a surface of a passivation layer of the stainless steel, and thus pitting corrosion resistance increases, and Sn suppresses the formation of $SiO_2$ oxide on a scale surface generated in the process of cold or hot rolling and annealing, thus increasing the process efficiency of cold or hot rolling and annealing. Related details will be described below.

Cu is an essential element for securing target corrosion resistance of the present invention. Cu is an element having excellent sulfuric acid corrosion resistance, but having low chloride corrosion resistance. In order to secure target corrosion resistance of the present invention, an addition of at least 0.5% Cu is required. The addition of 1% Cu or more causes a decrease in hot workability and problems in a manufacturing process, and thus the content of Cu is limited to 1% or less. According to the embodiment of the present invention, when Cu is added, corrosion resistance may be improved under a sulfuric acid atmosphere.

Figure 5:
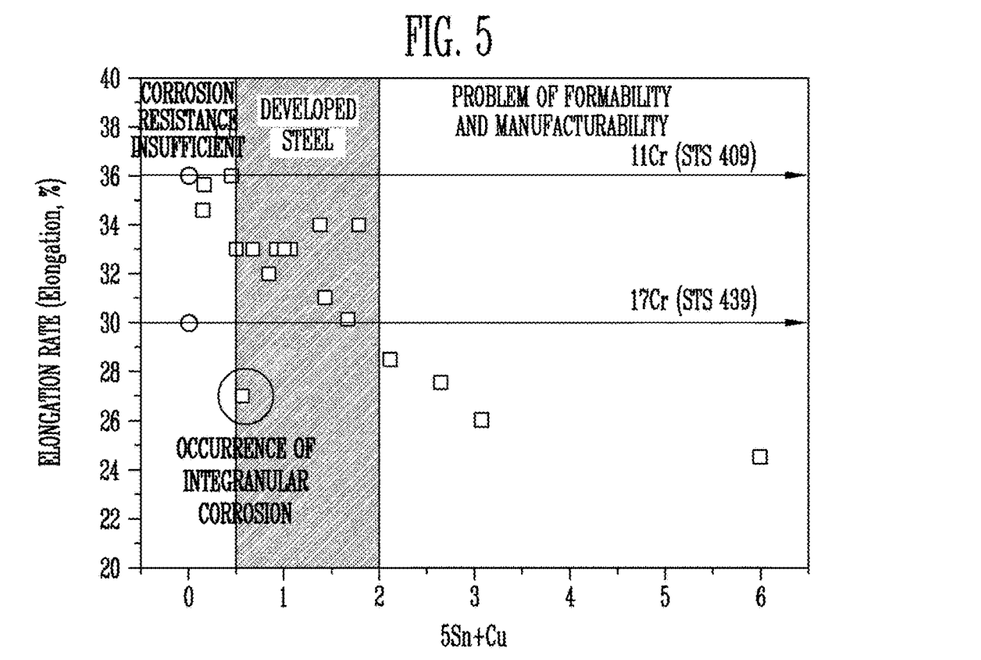
FIG. 5 shows a graph illustrating a result of measuring an elongation rate to determine formability according to the addition ratio of (5Sn+Cu) in the steel having 11%-Cr.

Further, according to the embodiment of the present invention, the test result of FIGS. 4 and 5 shows that (5Sn+Cu) in the range of 0.5 to 2.0 is effective in improving condensate corrosion properties and formability.

Next, the effect of Sn and Cu according to the embodiment of the present invention will be described in detail in conjunction with FIGS. 1A and 2B.

Figure 1A:
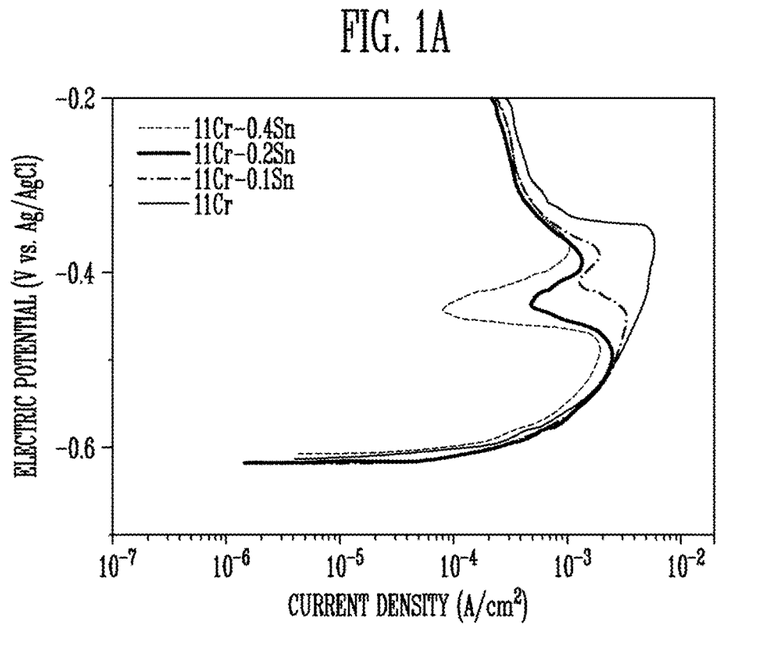
FIG. 1A is a graph illustrating anodic polarization characteristics of steel with the addition of Sn according to an embodiment of the present invention and steel without the addition of Sn in a condensate solution of automotive exhaust system.
Figure 1B:
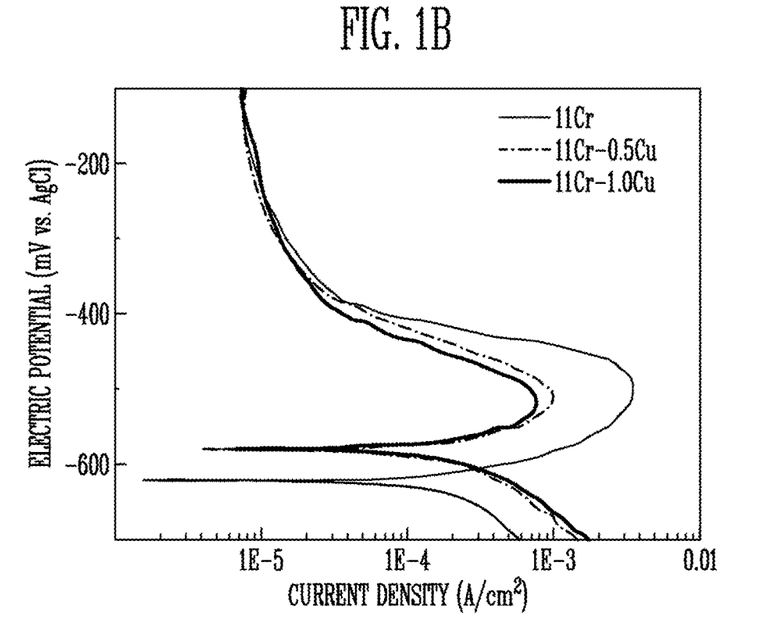
FIG. 1B is a graph illustrating anodic polarization characteristics of steel with the addition of Cu according to the embodiment of the present invention and steel without the addition of Cu in the condensate solution of the automotive exhaust system.

FIGS. 1A and 2B are graphs illustrating a comparison of anodic polarization properties of steel with the addition of alloying elements such as Sn, Cu, Cr, or the like according to the embodiment of the present invention and steel without the addition of the alloying elements in a condensate solution of the automotive exhaust system.

In order to test the anodic polarization properties in a condensate solution of the automotive exhaust system, high purity ferritic stainless steel including Cr at 11% and a simulated solution of condensed water of the automotive exhaust system (Cl$^-$: 500 ppm, $SO_4^{2-}$: 5,000 ppm, pH: 3.0) are prepared. Here, the solution has a temperature of 50° C. In this case, the anodic polarization properties of the ferritic stainless steel with the addition of Sn or Cu and stainless steel with the addition of Sn or Cu are compared. First, steel including Cr at 11% has a constant corrosion potential of about −600 mV regardless of the addition of Sn as shown in FIG. 1A. However, as the addition amount of Sn gradually increases, an activated current density tends to gradually decrease, and secondary-activated dissolution behavior is shown. From the result, it is determined that precipitates are formed on a surface of the steel after Sn is dissolved, decreasing an activated current density, and that Sn has excellent corrosion resistance under an $SO_4^{2-}$ containing environment. Further, referring to FIG. 1B, when Cu is added, a corrosion potential of about −630 mV is increased to about −560 mV, and thereby a corrosion potential is increased about 70 mV. A corrosion potential increases due to Cu, and thus corrosion resistance relatively increases. An activated current density about 5 to 10 times decreased according to the addition of Cu, and the corrosion current densities at a passivation area of steel with the addition of Cu and steel without the addition of Cu were identical. The result shows that a compact passivation film was formed. As a result, it may be determined that, when an alloying element such as Sn or Cu is added to high purity ferritic steel, a corrosion potential increases, an activated current density decreases, and starting potential decreases. Further, it was found that the steel has excellent corrosion resistance in the acidic environment in which pH is about 3 and a large amount of $SO_4^{2-}$ is contained. The environment in which a pH is 3, and 5,000 ppm of $SO_4^{2-}$ and $Cl^-$ ions are contained may show a corrosion tendency of a muffler material of the automotive exhaust system in China, India, Latin America and Russia, where a large amount of an S component, such as about 500 ppm, is included in gasoline components.

Figure 2:
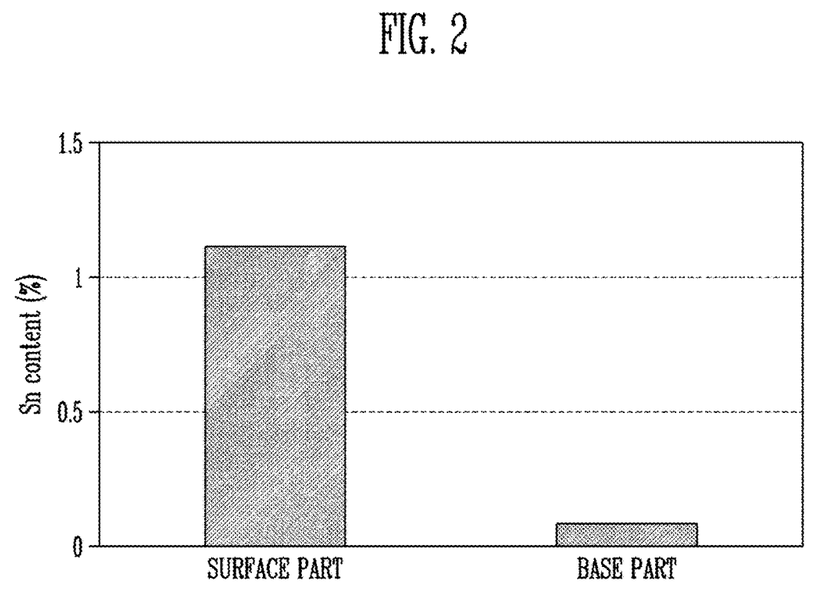
FIG. 2 is a graph illustrating a change in a concentration of Sn at a surface part and a base part of a ferritic stainless steel according to the embodiment of the present invention.
Figure 3:
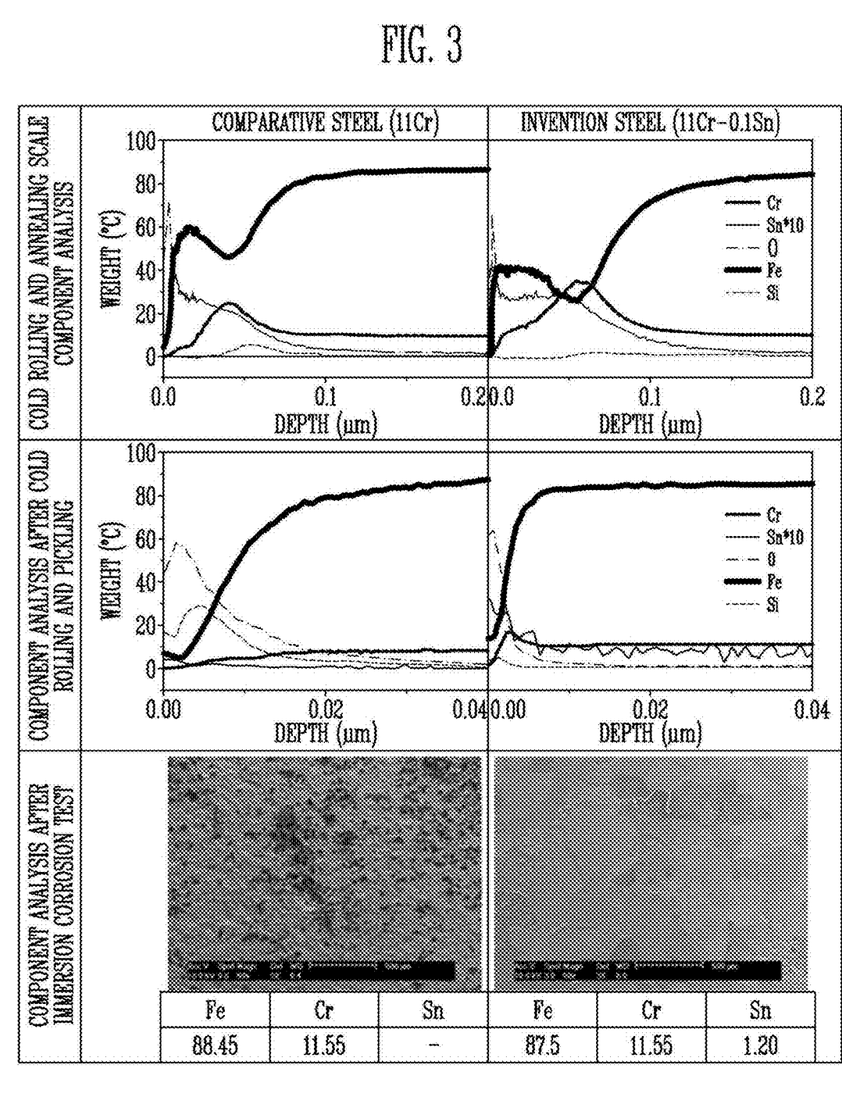
FIG. 3 shows graphs and pictures of a result of analyzing cold rolling and annealing scale components of a comparative steel containing 11Cr and steel containing 11Cr-0.1Sn according to the embodiment of the present invention in a depth direction, and a result of observing pictures of the surfaces of the steels and analyzing surface components of the steels after immersing the steels in an about 5%-sulfuric acid solution for 24 hours.

Meanwhile, FIG. 2 is a graph illustrating that Sn is concentrated at a surface of the stainless steel according to the embodiment of the present invention, and thereby condensate corrosion resistance is improved. Particularly, FIG. 3 shows a result of measuring the content of Sn at a surface part and base part of steel having 11Cr-0.1Sn, which is the invention steel according to the embodiment of the present invention. The surface part may be defined as a part extending from an outermost surface layer of the stainless steel to a depth of 1 μm in a depth direction as described above. However, FIG. 2 illustrates a result of measuring the content of Sn at a part extending from an outermost surface layer of the stainless steel to a depth of 0.1 μm in a depth direction. Further, the measurement result of the base part represents a measurement result at a depth of 500 μm in a depth direction. In the steel with the addition of about 0.1% of Sn according to the embodiment of the present invention, the content of Sn at the surface part of the steel is more than about 1%, and as compared to 0.1% of Sn at the base part, Sn concentrated at the surface part is 10 times or more than Sn concentrated at the base part. When a concentrated layer in which Sn is concentrated is present at a surface, excellent sulfuric acid corrosion resistance may be provided. A thermal diffusion of Sn occurs prior to those of the other elements in the cold rolling and annealing process, and thus Sn is concentrated at a surface of the steel. According to the embodiment of the present invention, conditions of surface concentration of Sn may be controlled by controlling heat treatment conditions in the cold rolling and annealing process as described above. Further, when Sn is concentrated at a surface as described above, an oxide of Fe, Cr, or the like generated in the cold rolling and annealing process is sufficiently dissolved and removed by subsequent neutral salt electrolytic and sulfuric acid electrolytic pickling processes. On the other hand, Sn concentrated at a surface is not dissolved and removed in the neutral salt electrolytic and sulfuric acid electrolytic pickling processes, and thus may remain in a concentrated state at a surface.

FIG. 3 shows graphs and pictures of a result of analyzing the cold rolling and annealing scale components of a comparative steel containing 11Cr and steel containing 11Cr-0.1Sn according to the embodiment of the present invention in a depth direction, and a result of observing pictures of surfaces of the steels and analyzing surface components of the steels after immersing the steels in an approximate 5%-sulfuric acid solution for 24 hours.

As illustrated in the drawing, a cold rolling and annealing scale of the comparative steel has a thickness of about 0.1 um, and the scale mainly includes Fe and Cr oxides, and a small amount of Si oxide. Meanwhile, an annealing scale of the invention steel according to the embodiment of the present invention mainly includes Fe and Cr oxides, but has a smaller amount of Si oxide than that in the comparative steel. Further, in the invention steel according to the embodiment of the present invention, about 1% Sn or more is concentrated at a part extending from a surface to a depth of about 0.1 μm in a depth direction, and thus Sn concentrated at a surface part of a stainless steel is 10 times or more than Sn concentrated at a base part. Referring to a result of analyzing components of a cold rolling and annealing scale in a depth direction after neutral salt-sulfuric acid electrolytic pickling is performed on the invention steel containing 11Cr-0.1Sn according to the embodiment of the present invention, a Fe and Cr annealing scale was removed, but Si oxide still remained in the comparative steel. On the other hand, a Fe and Cr annealing scale were removed, and no Si oxide was observed at a surface in the invention steel. Further, at least 1% Sn or more is concentrated at a surface.

Referring to a result of observing pictures of surfaces of the steels after the comparative steel and the invention steel are immersed in a 5%-sulfuric acid solution for 24 hours after cold rolling and pickling as described above, it may be seen that a surface of the comparative steel was corroded. On the other hand, a surface of the invention steel was not corroded.

As a result of analyzing components in a surface after an immersion corrosion test, it was observed that about 1% Sn was concentrated. From the result, it may be determined that Sn concentrated at a surface suppresses the formation of Si oxide in the cold rolling and annealing process, and thereby sufficient pickling may be achieved only by neutral salt-sulfuric acid electrolytic pickling. Further, an Sn layer concentrated at a surface remains without being removed by cold rolling and neutral salt-sulfuric acid electrolytic pickling processes, and thus the steel may have excellent sulfuric acid corrosion resistance. As may be seen from the result, when Sn is added to a base part, the formation of Si oxide in an annealing scale formed during the cold rolling and annealing process may be suppressed.

Meanwhile, FIG. 4 shows a result of comparing a result of a corrosion test in a simulated condensed water environment of the automotive exhaust system according to the addition ratio of 5Sn+Cu, in which Sn and Cu are added to the steel including 11% Cr according to the embodiment of the present invention, for 11Cr (STS 409) and 17Cr (STS 439), which are used in a cold part such as a muffler part of the automotive exhaust system. A condensate solution used in the present test is prepared according to a JASO-611-92 method of the Japanese automobile standards association. In the test, 10 ml of the solution was supplied to a specimen at 90° C. every 6 hours in air in which the specimen was completely dried after 5 hours, and this was repeated as a one cycle. After 80 cycles, a corrosion oxide of the specimen was removed in a boiling 60% nitric acid solution, and then a corrosion depth was measured. A maximum corrosion depth was defined after measuring a depth of 30 portions of the specimen. Referring to FIG. 4, under the environment of condensed water, the maximum corrosion depth of a steel grade of STS 409 which is an 11Cr steel was about 0.45 mm, and the maximum corrosion depth of a steel grade of STS 439 which is a 17Cr steel was about 0.25 mm. In the case of a steel grade of STS 409 which is a 11Cr steel, when the addition amount of 5Sn+Cu increased, a corrosion depth rapidly decreased, and when 5Sn+Cu is 0.5 or more, a corrosion depth was smaller than that of a steel grade of STS 439 which is a 17Cr steel. However, when 5Sn+Cu was 0.5 or less, the addition amount of alloys are insufficient, and thus a corrosion depth at a level of that of a steel grade of STS 439 which is a 17Cr steel was not observed. Meanwhile, when 5Sn+Cu is increased to 2 or more, a corrosion depth in the environment of condensed water decreases, and thus the steel may have excellent corrosion resistance, but there may be a problem in formability and manufacturability due to an excessive addition of alloys.

Figure 6:
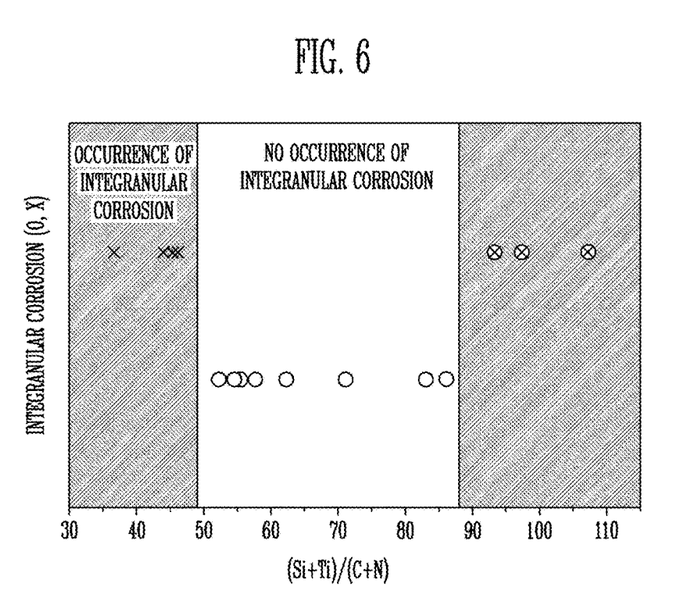
FIG. 6 shows a graph illustrating a measurement result of an intergranular corrosion test according to the addition ratio of (SI+Ti)/(C+N) in the 11Cr steel.

FIG. 6 is a result of comparing elongation rate measurement results of a steel grade of 11Cr STS 409 and a steel grade of 17Cr STS 439 which are used in the cold part such as the muffler part of the automotive exhaust system in order to determine formability of the steel including 11% Cr according to the addition ratio of (5Sn+Cu). An elongation rate of a steel grade of 11Cr STS 409 was about 36%, and an elongation rate of a steel grade of 17Cr STS 439 was about 30%. An elongation rate required for a processing site of the cold part of the automotive exhaust system is about 30% or more. When the amount of 5Sn+Cu added to 11Cr STS 409 increased, an elongation rate tended to linearly decrease. When 5Sn+Cu increased to 2 or more, an elongation rate decreased to 30% or less. In general, Sn and Cu have been known to decrease hot workability during hot working. However, the inventors of the present invention have found that, since Sn rapidly diffuses at a hot working temperature range, when the addition amount is less than about 0.5% Sn, hot workability may not decrease. In terms of formability, Sn and Cu are solid solution strengthening elements, and thus are known to decrease an elongation rate by increasing the strength of a material. However, it was determined for high purity ferritic stainless steel, when the addition amounts of Cr, Sn and Cu are suitably adjusted, for example, such that 5Sn+Cu is 2 or less, formability may be ensured and corrosion resistance may be improved without a decrease in an elongation rate.

Meanwhile, FIG. 6 shows an evaluation result of an intergranular corrosion test according to the addition ratio of (SI+Ti)/(C+N) to 11Cr. In the weld zone intergranular corrosion test, a sensitizing heat treatment was performed with respect to a GTA (TIG) welded specimen at 500° C. for 10 hours in air and the specimen was quenched to simulate a temperature atmosphere of the automotive exhaust system. Thereafter, according to a modified Strauss test method, after Cu balls were laid on a lower part of a 6% $CuSO_4$+ 0.5% $H_2SO_4$ solution, the specimen was immersed in the boiling solution for 24 hours, a sectional structure of the specimen was observed and a 1U-bend test was performed to evaluate intergranular corrosion. GTA (TIG) welding was performed using a DC type welder (maximum welding current 350 A) and a bead on plate. Welding conditions are as below: welding current: 110 A, welding speed: 0.32 m/min, Tungsten electrode diameter: 2.5 mm, electrode tip angle: 100°, arc length 1.5 mm, and shielding gas: Ar (15l/min).

The inventors of the present inventor have found that Si is an effective element for preventing intergranular corrosion at a sensitizing temperature in the range of about 400 to 700° C., which is a condition for operating the automotive exhaust system.

With respect to an 11Cr stainless steel, when the ratio of (SI+Ti)/(C+N) is 50 or less, intergranular corrosion occurred. On the other hand, when the ratio of (SI+Ti)/(C+N) is 50 or more, intergranular corrosion did not occur. On the other hand, when the ratio of (SI+Ti)/(C+N) is 90 or more, intergranular corrosion did not occur, but an amount of Si and Ti alloys increased, and thereby formability decreased to 30% or less, or there were many restrictions in a manufacturing process, such as surface cracking and nozzle clogging during a production process.

Further, according to the embodiment of the present invention, ferritic stainless steel having the alloy compositions as described above is plated with aluminum, and thereby further improved high temperature oxidation resistance and condensate corrosion properties may be obtained. It will be described in detail with reference to FIGS. 8 and 9.

Figure 8:
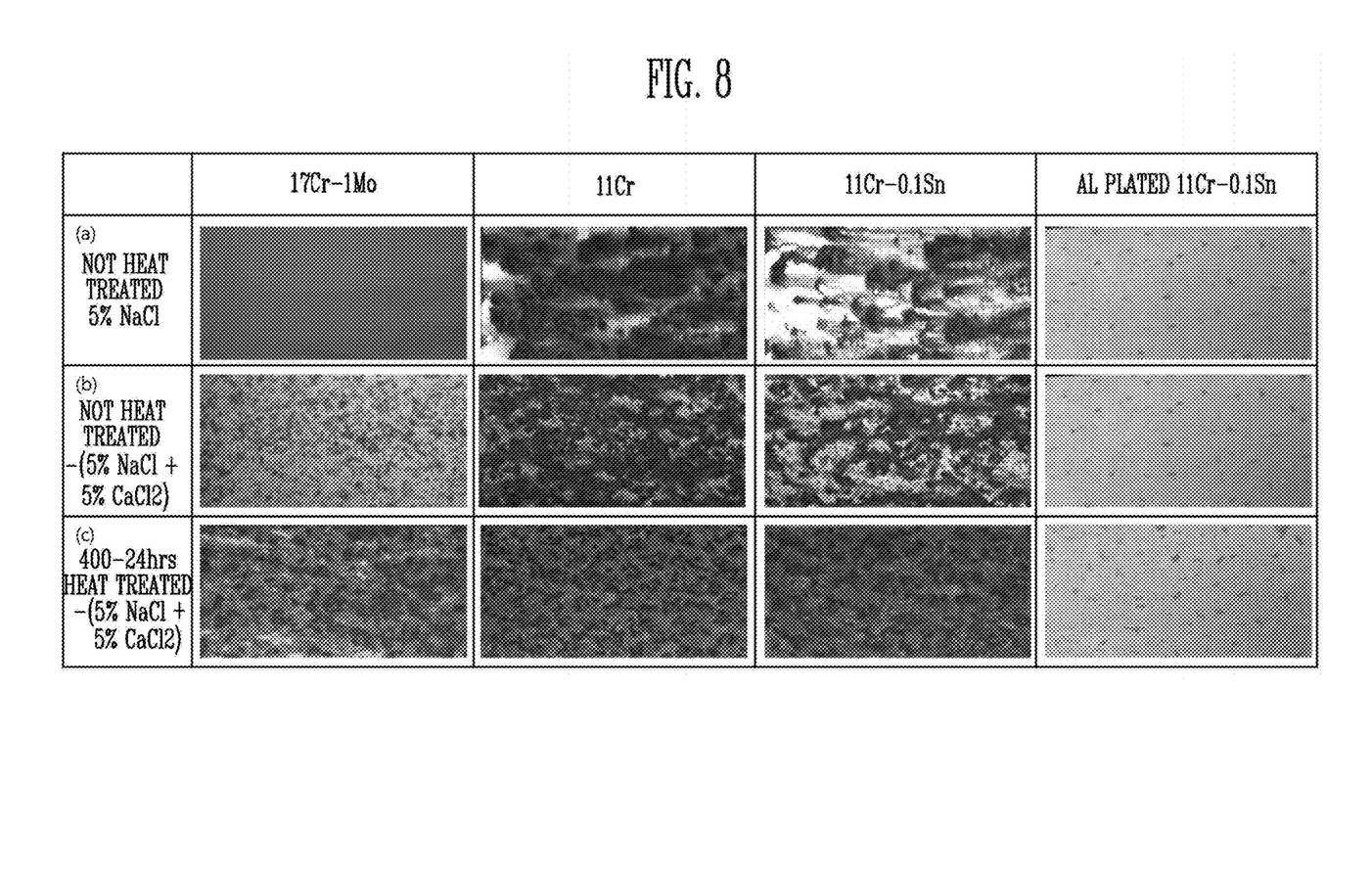
FIG. 8 shows structural images for comparing measurement results of exterior rust/corrosion resistance in a state in which the steel is continuously heated such as in the automobile exhaust system.

First, FIG. 8 shows structural images for comparing measurement results of exterior rust/corrosion resistance in a state in which steel is continuously heated such by a simulated salt solution for snow removal or the automobile exhaust system. This shows an evaluation result of exterior rust/corrosion resistance of a material of the automotive exhaust system. In general, stainless steel (STS) 436L which is 17Cr-1Mo steel has excellent exterior rust/corrosion resistance, and thus is frequently used for a material of the automotive exhaust system. However, as shown in FIG. 8B or 8C, oxidation and red corrosion are generated in a short time at a part which is continuously heated by a simulated salt solution for snow removal (5% NaCl+5% $CaCl_2$) or the automotive exhaust system, and thus an exterior appearance is damaged. When Sn is added at 0.1% to 11Cr steel, exterior rust/corrosion resistance is relatively improved as compared to that of a 11Cr steel, but red corrosion occurs in a short time at a part which is continuously heated by the simulated salt solution for snow removal or the automotive exhaust system. However, in the case of the specimen which is 11Cr-0.1Sn steel plated with aluminum, it may be determined that red corrosion does not occur at a part which is continuously heated by the simulated salt solution for snow removal or the automotive exhaust system.

Figure 9:
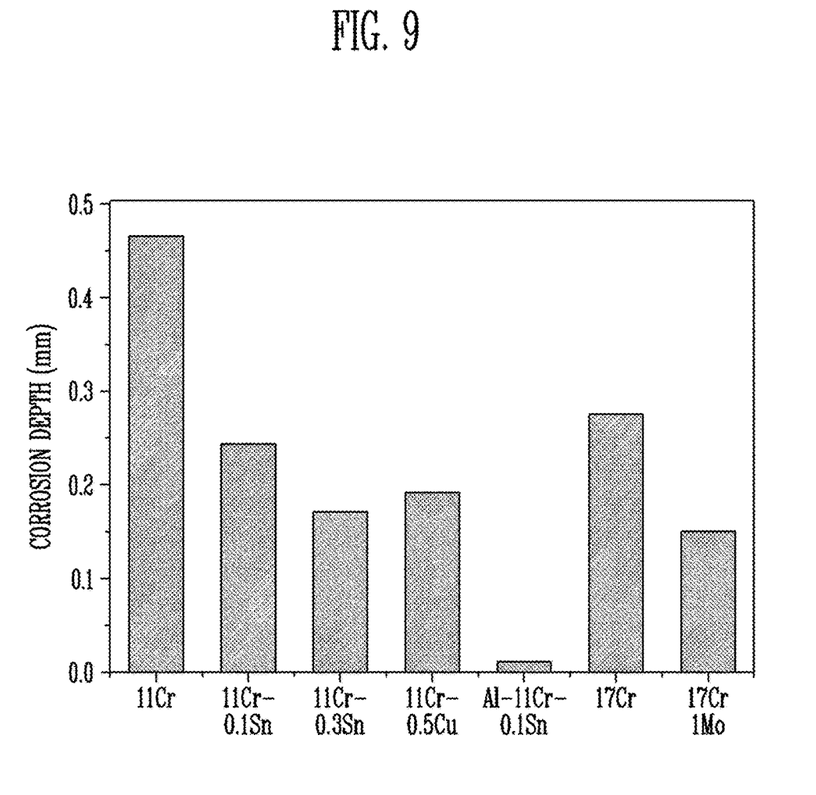
FIG. 9 is a graph illustrating a result of measuring corrosion resistance according to the addition of alloying elements of Sn and Cu and Al plating under the condensed water environment of the automotive exhaust system.

FIG. 9 is a graph illustrating a result of measuring corrosion resistance under the condensed water environment of the automotive exhaust system according to the addition of alloying elements of Sn and Cu, and Al plating. A condensate solution used in the present test is prepared according to a JASO-611-92 method of Japan automobile standards association. In the test, 10 ml of the solution was supplied to a specimen at 90° C. every 6 hours in air in which the specimen was completely dried after 5 hours, and this was repeated as a one cycle. After 80 cycles, a corrosion depth was measured for evaluation. A maximum corrosion depth was defined after measuring a depth of 30 portions of the specimen. Referring to the maximum corrosion depth, when Sn and Cu were added to 11Cr STS 409L, the corrosion depth rapidly decreased. The corrosion depth also gradually decreased according to the addition amount of Sn and Cu. Referring to the maximum corrosion depth, when Sn is added at 0.05 to 0.5%, preferably at 0.1 to 0.5% to 11Cr, the corrosion depth similar to that of 17Cr or 17Cr-1Mo was shown. Further, when the steel is plated with Al, it may be determined that the corrosion depth is significantly smaller than that of STS 436L which is 17Cr-1Mo stainless steel.

From the results of FIGS. 8 and 9 as described above, the inventors of the present invention determined that, when an alloying element of Sn or Sn and Cu is added to steel and the steel is plated with Al, a steel grade for the exhaust system which has excellent condensate corrosion resistance as compared to STS 436L under the environment in which a large amount of the S component is contained in gasoline components, and by which no red corrosion occurs in a part which is continuously heated by an automotive exhaust system, may be developed.

Next, the manufacturing method according to the embodiment of the present invention will be described.

(Slab Heating Temperature Condition)

For the ferritic stainless steel according to the embodiment of the present invention, slab heating temperature condition is controlled. Preferably, the slab heating temperature condition is in the range of 1,100 to 1,240° C. In general, the slab heating temperature is limited to the range of 1,100 to 1,240° C. such that a grain size is reduced to improve toughness and an r value, and to ensure formability and processability. When the slab heating temperature is 1,100° C. or less, a sticking defect occurs, that is, a surface part of a material is detached from the material and attached to a rolling roll upon hot rolling. Further, when the slab heating temperature is 1,240° C. or more, a grain size of a product is coarsened, and thereby toughness and an r value decrease. Accordingly, the slab heating temperature is preferably limited to the range of 1,100 to 1,240° C.

(Hot Rolling and Annealing Temperature Condition)

According to the embodiment of the present invention, the hot rolling and annealing temperature is in the range of 1,030 to 1,070° C. based on a strip temperature. Regarding the hot rolling and annealing temperature in manufacturing conditions for the stainless steel according to the embodiment of the present invention, when the steel is annealed at a relatively low temperature within the range in which recrystallization is performed, a recrystallized grain size is reduced after annealing, and thus an r-bar value of a final cold annealed plate is excellent. However, when the hot rolling and annealing temperature is 1,030° C. or less, recrystallization is insufficiently performed, and thus formability and an elongation rate decrease, and when the hot rolling and annealing temperature is 1,070° C. or more, toughness of a hot annealed coil decreases, and thus there is a concern of strip breakage during the manufacturing process, a grain size is coarsened, and thus an orange peel defect may be generated upon molding. Accordingly, annealing is preferably performed at a temperature in the range of 1,030 to 1,070° C. to improve toughness and an r value.

(Cold Rolling and Annealing Temperature)

According to the embodiment of the present invention, the cold rolling and annealing temperature is in the range of 980 to 1,020° C. based on a strip temperature. With respect to the stainless steel according to the embodiment of the present invention, when the cold rolling and annealing temperature is 980° C. or less, recrystallization after annealing is insufficiently performed, and thus an elongation rate and formability may decrease. Further, when the cold rolling and annealing temperature is 1,020° C. or more, a grain size is coarsened, and thus an orange peel defect may be generated upon molding. Accordingly, cold rolling and annealing is preferably performed in the above-described range to improve high temperature strength by reducing the grain size of precipitates.

(Cold Rolling and Pickling Condition)

The ferritic stainless steel according to the embodiment of the present invention has a specific cold rolling and pickling condition. Particularly, after cold rolling and annealing, Si oxide included in an annealing scale is removed through primary neutral salt electrolytic pickling and secondary sulfuric acid electrolytic pickling. In an existing pickling process contrasting with the present invention, pickling was performed through mixed acid soaking after neutral salt electrolytic pickling and secondary sulfuric acid electrolytic pickling.

Figure 7:
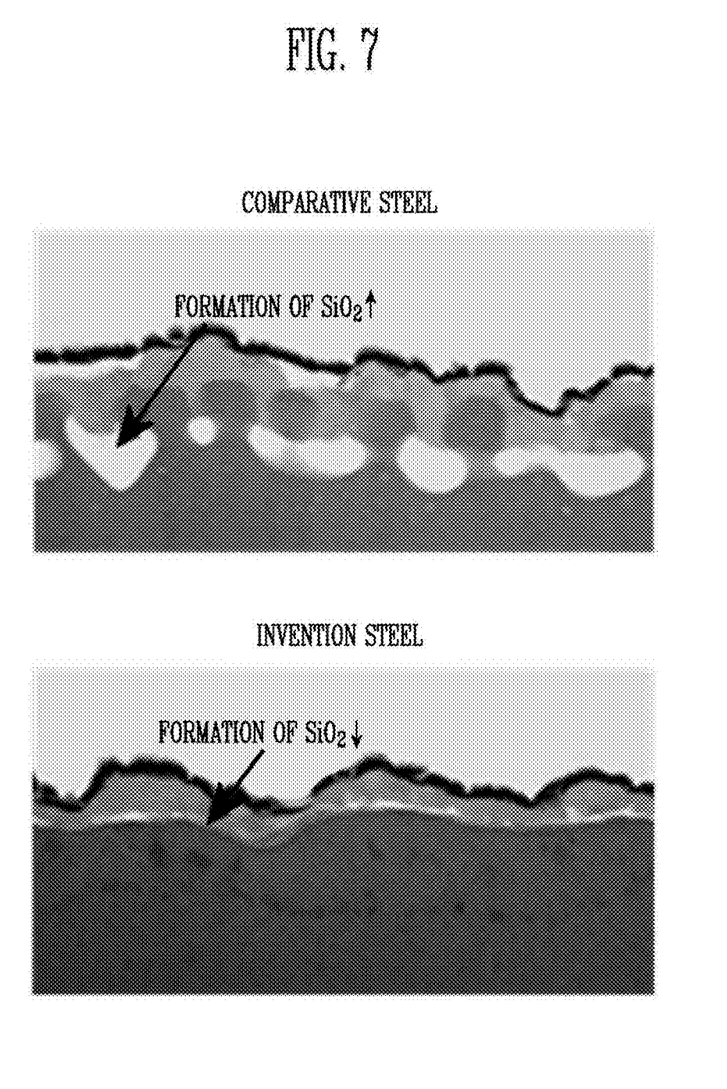
FIG. 7 shows structural images illustrating a formation position and shape of $SiO_2$ at a vicinity of a surface part of the comparative steel and the invention steel.

FIG. 7 shows structural images for illustrating a difference in cold rolling and pickling conditions according to a type of $SiO_2$ formation of an existing steel grade of STS 409 which is the comparative steel and the invention steel according to the embodiment of the present invention. In the case of the comparative steel, as shown in FIG. 7, coarsened $SiO_2$ may be seen at the vicinity of a surface of the stainless steel. Accordingly, the existing steel grade of STS 409 necessarily requires a pickling process through mixed acid soaking in addition to neutral salt electrolytic pickling and secondary sulfuric acid electrolytic pickling. However, the above-described mixed acid soaking causes serious environmental issues due to the use of nitric acid and hydrofluoric acid. Meanwhile, in the case of the invention steel according to the embodiment of the present invention, a relatively smaller amount of Si oxide is formed as compared to that of the comparative steel, and the Si oxide is formed in a thin and continuous strip shape. Particularly, in the case of the invention steel including 11Cr-0.1Sn according to the embodiment of the present invention, referring to a result of analyzing components of a cold rolling and annealing scale in a depth direction after neutral salt-sulfuric acid electrolytic pickling is performed on the steel, a Fe and Cr annealing scale was removed, and no Si oxide is observed in a surface of the steel.

Particularly, in the case of the invention steel, referring to a result of observing a surface picture after the invention steel is immersed in a 5% sulfuric acid solution for 24 hours, the surface is not corroded, and as a result of a surface component analysis after an immersion corrosion test, about 1% Sn is concentrated at the surface. From the result, it may be determined that Sn concentrated at a surface suppresses the formation of Si oxide in the cold rolling and annealing process, and thereby sufficient pickling may be achieved only by neutral salt-sulfuric acid electrolytic pickling. Further, an Sn layer concentrated at a surface remains without being removed by a cold rolling and neutral salt-sulfuric acid electrolytic pickling processes, and thus the steel may have excellent sulfuric acid corrosion resistance. As a result, it may be determined that, when Sn is added to a base part, the formation of Si oxide in an annealing scale formed during the cold rolling and annealing process may be suppressed, and sufficient pickling may be achieved only by typical neutral salt-sulfuric acid electrolytic pickling. The pickling conditions according to the embodiment of the present invention preferably include a temperature in the range of 70 to 90° C. and a neutral salt concentration in the range of 150 to 250 g/L, as a typical pickling condition for a ferritic stainless steel. Further, secondary sulfuric acid electrolytic pickling conditions preferably include a temperature in the range of 30 to 50° C. and a sulfuric acid concentration in the range of 65 to 85 g/L.

Subsequently, aluminum plating conditions and processes according to the embodiment of the present invention will be described. The process of plating aluminum on a surface of the stainless steel may be performed after both the cold rolling and pickling processes, or may also be performed before the cold rolling and pickling processes. According to the embodiment of the present invention, the aluminum plating process includes preprocessing of a base metal, preheating and heat cracking, and plating with aluminum, as typical hot-dip aluminizing. A typical hot-dip aluminizing process may be used for the following preprocessing, preheating and heating, and plating.

(Preprocessing of base metal)

Preprocessing of the base metal is performed in order to remove foreign substances from the surface of the base metal and induce an immediate surface reaction under an oxidizing atmosphere of a front end preheating zone by heating, which is the next process, after removing. Preprocessing is preferably electrolytic cleaning. The steel is bathed in a caustic soda solution having a concentration in the range of 2 to 5% in a high temperature bath tank at a temperature in the range of 60 to 80° C. Subsequently, foreign substances such as oil or the like are removed from the surface of the base metal under conditions of an electrolytic process, and final cleaning is performed in a high temperature cleaning tank.

(Preheating and Heat Cracking)

Preheating is performed under conditions of a preheating temperature of 530° C. or more and an oxygen concentration of 20 ppm or more such that a composite oxide layer of activated Fe and Cr is formed on the preprocessed surface of the base metal, and the stainless steel is heated under conditions of a heating temperature in a range of 900 to 1,000° C., a hydrogen concentration of 30% or more, and a dew point temperature in the range of −30 to −45° C., and cooled to a temperature in a range of about 630 to 730° C. for annealing such that the composite oxide layer of activated Fe and Cr is reduced.

(Hot Dip Aluminizing)

After the annealed base metal is plated in a molten aluminum plating bath at a temperature in the range of 600 to 700° C., and the plated steel plate is cooled at a cooling rate in the range of 20 to 40° C./sec to a temperature of 350° C. or less to manufacture a plated steel plate. Composition of the molten aluminum plating bath include Al at 88 to 92% and Si at 8 to 11%. The base metal of the stainless steel is continuously immersed in the composition of the molten aluminum plating bath, and is controlled to have a plating layer with a suitable thickness. Preferably, plating is performed such that the plating layer of the plated steel has a thickness of 200 μm or less.

Examples

Hereinafter, the present invention will be described in detail in conjunction with examples.

An ingot having a thickness of 120 mm is prepared by dissolving ferritic stainless steel having the compositions represented in Table 1 in a vacuum induction furnace with a capacity of 50 kg. The prepared ingot was hot rolled at a temperature in the range of 1,100 to 1,200° C. to manufacture a hot rolled plate having a thickness of 3.0 mm Thereafter, after annealing and pickling the hot rolled steel plate, cold rolling was performed such that a plate thickness of a cold rolled plate is 1.2 mm, and a pickling process was performed, and thereby the steel plate was used for the evaluation of corrosion resistance and mechanical properties. Compositions in the range defined by the present invention, and compositions out of the range defined by the present invention were used. Compositions of the comparative steel were set to be similar to those of a steel grade of 11Cr STS 409 and those of a steel grade of 17Cr STS 439.

The following Table 1 represents a composition table for the stainless steel according to the embodiment of the present invention.

TABLE 1

| No. | Classification | C | Si | Mn | P | S | Cr | Ti | Sn | N | Cu | Mo | (Si + Ti)/(C + N) | 5Sn + Cu |
|---|---|---|---|---|---|---|---|---|---|---|---|---|---|---|
| 1 | Invention | 0.005 | 0.654 | 0.213 | 0.03 | 0.003 | 11.14 | 0.175 | 0.099 | 0.0095 | 0.00 | 0.0 | 57.2 | 0.5 |
| 2 | steel | 0.005 | 0.568 | 0.211 | 0.02 | 0.003 | 11.19 | 0.210 | 0.174 | 0.0075 | 0.50 | 0.0 | 62.2 | 1.4 |
| 3 | | 0.006 | 0.895 | 0.207 | 0.03 | 0.003 | 11.10 | 0.208 | 0.05 | 0.0073 | 0.68 | 0.0 | 82.9 | 0.9 |
| 4 | | 0.006 | 0.564 | 0.203 | 0.01 | 0.003 | 13 | 0.212 | 0.099 | 0.0079 | 0.56 | 0.0 | 55.8 | 1.1 |
| 5 | | 0.006 | 0.517 | 0.203 | 0.02 | 0.003 | 12.17 | 0.177 | 0.185 | 0.0073 | 0.00 | 0.0 | 52.2 | 1.0 |
| 6 | | 0.006 | 0.517 | 0.203 | 0.02 | 0.003 | 12.57 | 0.177 | 0.285 | 0.0073 | 0.00 | 0.0 | 52.2 | 1.5 |
| 7 | | 0.006 | 0.520 | 0.193 | 0.03 | 0.003 | 13 | 0.283 | 0.075 | 0.0086 | 0.63 | 0.0 | 55.0 | 1.0 |
| 8 | | 0.004 | 0.693 | 0.212 | 0.02 | 0.003 | 11.19 | 0.210 | 0.061 | 0.0065 | 0.84 | 0.0 | 86.0 | 1.2 |
| 9 | | 0.006 | 0.785 | 0.193 | 0.03 | 0.003 | 12.40 | 0.253 | 0.212 | 0.0086 | 0.73 | 0.0 | 71.1 | 1.8 |
| 10 | Comparative | 0.005 | 0.400 | 0.213 | 0.02 | 0.003 | 11.13 | 0.207 | 0.030 | 0.0082 | 0.41 | 0.0 | 46.0 | 0.6 |
| 11 | steel | 0.005 | 1.181 | 0.109 | 0.03 | 0.003 | 9.98 | 0.125 | 0.071 | 0.0090 | 0.00 | 0.0 | 93.3 | 0.4 |
| 12 | | 0.006 | 0.514 | 0.207 | 0.02 | 0.003 | 11.10 | 0.252 | 0.750 | 0.0073 | 0.23 | 0.0 | 57.6 | 4.0 |
| 13 | | 0.007 | 0.540 | 0.509 | 0.02 | 0.003 | 9.50 | 0.185 | 0.089 | 0.0090 | 0.00 | 0.0 | 45.3 | 0.4 |
| 14 | | 0.007 | 0.495 | 0.213 | 0.03 | 0.003 | 11.13 | 0.174 | 0.000 | 0.0082 | 0.16 | 0.0 | 44.0 | 0.2 |
| 15 | | 0.006 | 0.650 | 0.204 | 0.03 | 0.003 | 9.85 | 0.208 | 0.050 | 0.0078 | 1.85 | 0.0 | 62.2 | 2.1 |
| 16 | | 0.006 | 1.086 | 0.213 | 0.02 | 0.003 | 10.98 | 0.203 | 0.030 | 0.0062 | 0.00 | 0.0 | 105.6 | 0.2 |
| 17 | | 0.005 | 0.408 | 0.109 | 0.02 | 0.003 | 13.98 | 0.105 | 0.310 | 0.0090 | 1.09 | 0.0 | 36.6 | 2.6 |
| 18 | | 0.006 | 1.212 | 0.207 | 0.02 | 0.003 | 12.50 | 0.213 | 0.795 | 0.0073 | 2.01 | 0.0 | 107.1 | 6.0 |
| 19 | | 0.004 | 0.564 | 0.509 | 0.03 | 0.003 | 12.45 | 0.155 | 0.109 | 0.0090 | 1.12 | 0.0 | 55.3 | 1.7 |
| 20 | | 0.007 | 0.552 | 0.193 | 0.02 | 0.003 | 11.00 | 0.274 | 0.000 | 0.0082 | 0.00 | 0.0 | 54.3 | 0.0 |
| 21 | | 0.007 | 0.500 | 0.229 | 0.02 | 0.003 | 17.65 | 0.214 | 0.000 | 0.0080 | 0.00 | 1.1 | 47.6 | 0.0 |

Table 2 shows a result of measuring the occurrence of GTA-welded zone intergranular corrosion, a corrosion depth under the environment of condensed water, and an elongation rate of the high purity ferritic stainless steel according to the embodiment of the present invention.

TABLE 2

| No. | Classification | Occurrence of intergranular corrosion (⊚, X) | Corrosion depth under environment of condensed water (mm) | Elongation rate (%) |
|---|---|---|---|---|
| 1 | Developed | ⊚ | 0.24 | 33.0 |
| 2 | steel | ⊚ | 0.16 | 34.0 |
| 3 | | ⊚ | 0.17 | 33.0 |
| 4 | | ⊚ | 0.18 | 33.0 |
| 5 | | ⊚ | 0.21 | 33.0 |
| 6 | | ⊚ | 0.16 | 31.0 |
| 7 | | ⊚ | 0.20 | 33.0 |
| 8 | | ⊚ | 0.21 | 32.0 |
| 9 | | ⊚ | 0.18 | 34.0 |
| 10 | Comparative | X | 0.27 | 27.0 |
| 11 | steel | ⊚ | 0.31 | 37.8 |
| 12 | | ⊚ | 0.13 | 26.0 |
| 13 | | X | 0.33 | 36.0 |
| 14 | | X | 0.44 | 35.6 |
| 15 | | ⊚ | 0.15 | 28.5 |
| 16 | | ⊚ | 0.57 | 34.6 |
| 17 | | X | 0.16 | 27.5 |
| 18 | | ⊚ | 0.08 | 24.5 |
| 19 | | ⊚ | 0.17 | 30.1 |
| 20 | | ⊚ | 0.45 | 36.0 |
| 21 | | ⊚ | 0.25 | 30.0 |

(Weld Zone Intergranular Corrosion Test)

First, according to a modified Strauss test method, after Cu balls were laid on a lower part of a 6% $CuSO_4$+0.5% $H_2SO_4$ solution, a specimen was immersed in a boiling solution for 24 hours, a sectional structure of the specimen was observed and a 1U-bend test was performed to investigate the formation of cracks (R=2t). The case in which no crack is formed after the 1U-bend test is represented by "⊚" which indicates no occurrence of intergranular corrosion, and the case in which cracks are formed after the 1U-bend test is represented by "X" which indicates the occurrence of intergranular corrosion. GTA (TIG) welding was performed using a DC type welder (maximum welding current 350 A) and a bead on plate. Welding conditions are as below: welding current: 110 A, welding speed: 0.32 m/min, Tungsten electrode diameter: 2.5 mm, electrode tip angle: 100°, arc length 1.5 mm, and shielding gas: Ar (15l/min).

(Evaluation of Corrosion Resistance Under Environment of Condensed Water)

For the evaluation of corrosion resistance under the environment of condensed water, 10 ml of the condensate solution manufactured according to a JASO-611-92 method of Japan automobile manufacturers association was supplied to a specimen at 90° C. every 6 hours in air in which the specimen was completely dried after 5 hours, and this was repeated as a one cycle. After 80 cycles, a corrosion oxide of the specimen was removed in a boiling 60% nitric acid solution, and then a corrosion depth was measured. Here, the condensate solution having a Cl⁻ concentration of 50 ppm and a $SO_4^{2-}$ concentration of 5,000 ppm was used after analyzing components of an automotive muffler used in China. After the test, corrosion resistance was evaluated using a maximum corrosion depth which is defined after measuring a depth of 30 portions of the specimen.

The invention steel has a maximum corrosion depth of 0.25 mm or less. The existing well-known JASO-611-92 method was used as the corrosion evaluation method in the embodiment of the present invention, and details will be omitted.

Further, according to the embodiment of the present invention, the stainless steel also has a maximum corrosion depth of 0.25 mm or less measured using a JASO M609-91 method which is a method for measuring corrosion resistance under the environment of condensed water. According to the method of evaluating corrosion resistance, spraying was performed on the stainless steel at pH 7.0 using a salt spray method for 1 hour, the stainless steel was dried for 2 hours, and this was repeated by 10 cycles to obtain a final value of a corrosion depth. The maximum corrosion depth of the invention steel was 0.25 mm or less. The existing well-known JASO M609-91 method was used as the corrosion evaluation method in the embodiment of the present invention, and details will be omitted.

(Formability Evaluation)

Further, according to the embodiment of the present invention, the formability evaluation was performed by preparing a JIS 13B tensile specimen using a cold rolled steel plate having a thickness of 1.2 mm to measure an elongation rate.

The above-described evaluation result may be seen in detail through a result of measuring the occurrence of GTA-welded zone intergranular corrosion, a corrosion depth under the environment of condensed water, and an elongation rate of the high purity ferritic stainless steel according to the embodiment of the present invention in Table 2.

Referring to Tables 1 and 2, Specimen Nos. 1 to 9 are based on components of the invention steel according to the embodiment of the present invention, and Specimen Nos. 10 to 21 are related to the comparative steel. According to the weld zone intergranular corrosion test, intergranular corrosion occurred at the steels of Specimen Nos. 10, 13, 14 and 17.

In the case of Specimen Nos. 1 to 9 which are the invention steels, weld zone intergranular corrosion did not occur, and the corrosion depth under the environment of condensed water was less than 0.25 mm. Further, all the elongation rates were more than 30% in the formability evaluation.

The comparative steel of Specimen No. 10 includes 0.4% Si and 0.03% Sn, and thus is out of the scope of the present invention. Further, it may be determined that the ratio of (SI+Ti)/(C+N) is 50 or less. Accordingly, intergranular corrosion may occur in the comparative steel 10.

Meanwhile, the comparative steels of Specimen Nos. 13, 14 and 17 also have Mn, Si, Sn, Cr, Ti or the like which are out of the scope of the present invention, and have the ratio of (SI+Ti)/(C+N) of 50 or less, as well.

Accordingly, intergranular corrosion may also occur in the comparative steels of Specimen Nos. 13, 14 and 17.

Meanwhile, the comparative steel of Specimen No. 11 has Si and Ti which are out of the scope of the present invention, and also has 5Sn+Cu out of the scope of the present invention. Although intergranular corrosion did not occur in the comparative steel of Specimen No. 11, it may be determined that the corrosion depth under the environment of condensed water is 0.31 mm.

In the case of the comparative steels of Specimen Nos. 12, 15, 17, 18 and 19, the excess amount of alloys such as Sn, Cu, Si or the like are added, and thus the formability is 30% or less as compared to the invention steel.

Further, in the case of the comparative steels of Specimen Nos. 10, 11, 13, 14, 16 and 20, the corrosion depth under the environment of condensed water is 0.25 mm or more.

In the case of the comparative steel of Specimen No. 21, the ratio of (Si+Ti)/(C+N) is 50 or less, but the content of Cr is 17%, and no intergranular corrosion occurred in the intergranular corrosion test. However, the content of Cr is out of the scope of the present invention, and the content of Cr as described above decreases economic efficiency.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

The invention claimed is:

1. A ferritic stainless steel, comprising: by wt %, C: more than 0 and 0.01% or less, Cr: 9 to 13%, Si: 0.5 to 1.0%, Mn: more than 0 and 0.5% or less, P: more than 0 and 0.035% or less, S: more than 0 and 0.01% or less, Ti: 0.15 to 0.5%, N: more than 0 and 0.01% or less, Sn: 0.05 to 0.5%, and Fe and unavoidable impurities as the remainder, wherein Sn concentrated at a surface part of the stainless steel is 10 times or more than Sn concentrated at a base part of the stainless steel, the surface part extends from a surface of the stainless steel to a depth of 1 μm and the base part is the remainder of the stainless steel, and 0.5 to 1.5% Sn is included in the surface part of the stainless steel.

2. The ferritic stainless steel of claim 1, further comprising 0.5 to 1.0% Cu.

3. The ferritic stainless steel of claim 2, wherein the stainless steel has (5Sn+Cu) in a range of 0.5 to 2.0.

4. The ferritic stainless steel of claim 1, wherein the stainless steel has (Si+Ti)/(C+N) in a range of 50 to 90.

5. The ferritic stainless steel of claim 1, wherein a coating of aluminum covers the surface of the stainless steel.

6. The ferritic stainless steel of claim 5, wherein the coating of aluminum has a thickness of 200 μm or less.

7. The ferritic stainless steel of claim 4, wherein the stainless steel has a maximum corrosion depth of 0.25 mm or less measured using a JASO M609-91 method which is a method for measuring corrosion resistance under an environment of condensed water.

8. The ferritic stainless steel of claim 4, wherein the stainless steel has a corrosion area ratio of 5% or less measured after 3 cycles of a JASO M611-92 method were performed, and a maximum corrosion depth of 0.25 mm or less measured after 100 cycles of the JASO M611-92 method were performed, the JASO M611-92 method is a method for measuring corrosion on an external surface of an automobile exhaust gas system.

* * * * *